United States Patent [19]
Santi

[11] Patent Number: 5,243,878
[45] Date of Patent: Sep. 14, 1993

[54] CONNECTING ROD WITH IMPROVED JOINT DESIGN

[75] Inventor: John Santi, West Allis, Wis.

[73] Assignee: Briggs & Stratton Corp., Wauwatosa, Wis.

[21] Appl. No.: 924,847

[22] Filed: Aug. 4, 1992

[51] Int. Cl.$^5$ .............................................. G05G 1/00
[52] U.S. Cl. ............................. 74/579 R; 74/579 E
[58] Field of Search ................ 74/579 R, 579 E, 587

[56] References Cited

U.S. PATENT DOCUMENTS

| | | | |
|---|---|---|---|
| 3,285,098 | 11/1966 | Beveridge | 74/579 R |
| 3,818,577 | 6/1974 | Bailey et al. | 74/579 R X |
| 3,842,938 | 10/1974 | Barnes-Moss | 74/579 R X |
| 4,569,109 | 2/1986 | Fetouh | 74/579 R X |
| 4,688,446 | 8/1987 | Ishikawa | 74/579 E |
| 4,802,269 | 2/1989 | Mukai et al. | 74/579 R X |
| 5,048,368 | 9/1991 | Mrdjenovich et al. | 74/579 E |

FOREIGN PATENT DOCUMENTS 1198613 8/1965 Fed. Rep. of Germany .... 74/579 R
869326 5/1961 United Kingdom ............ 74/579 R Primary Examiner—Leslie A. Braun
Assistant Examiner—Andrea Pitts
Attorney, Agent, or Firm—Andrus, Sceales, Starke & Sawall

[57] ABSTRACT

A connecting rod for a reciprocating piston of an internal combustion engine. The connecting rod includes a two-piece crankpin bearing which is formed by an integral crankpin bearing portion and an arcuate-shaped cap member disposed in mating relationship therewith to attach the connecting rod to a crankpin of a crankshaft. The crankpin bearing includes a wedge-shaped key which cooperates with a tapered key-receiving groove which is dimensioned to permit an initial press fit assembly between the cap member and the crankpin bearing portion. The key and groove facilitate assembly of the cap member to the crankpin bearing portion by providing proper alignment of these components, and further facilitates disassembly of the cap member from the crankpin bearing portion should the connecting rod need repair or replacement.

6 Claims, 2 Drawing Sheets ed by the cap member at diametrically opposite sides of the crankpin bearing hole. The location and dimensions of these steps or shoulders were such that when the cap member was assembled on the integral arcuate shaped crankpin bearing portion of the beam the crankpin bearing became prestressed radially outwardly across its diameter. Thus, when the crankpin bearing became hot during operation, and in particular when its temperature approached its seizing temperature, the crankpin bearing would expand radially outwardly at the joint location and at the same time would expand radially inwardly at locations diametrically opposite from the joint. Essentially, the crankpin bearing would change from a circular configuration to an oval configuration. This change results in a loss of oil film between the crankpin and crankpin bearing which in turn results in scoring of the crankpin and eventually seizing of the crankpin and crankpin bearing.

CONNECTING ROD WITH IMPROVED JOINT DESIGN

BACKGROUND OF THE INVENTION

The present invention relates to a connecting rod for a reciprocating piston of an internal combustion engine, and more particularly to the crankpin bearing thereof.

In the past, the crankpin bearing of a connecting rod has typically been a two-piece construction to permit assembly of the connecting rod onto the crankpin of a crankshaft of an internal combustion engine. The two-piece construction typically includes an integral arcuate shaped portion at one end of the rigid beam or body of the connecting rod, and a corresponding arcuate shaped cap disposed in mating relationship therewith. When joined together the cap and crankpin bearing portion define the crankpin bearing and a crankpin bearing hole for receiving a crankpin of a crankshaft.

In order to properly align the cap member with respect to the integral arcuate shaped bearing portion, it is known to form a pair of shoulders or steps in the joint formed by the cap member at diametrically opposite sides of the crankpin bearing hole. The location and dimensions of these steps or shoulders were such that when the cap member was assembled on the integral arcuate shaped crankpin bearing portion of the beam the crankpin bearing became prestressed radially outwardly across its diameter. Thus, when the crankpin bearing became hot during operation, and in particular when its temperature approached its seizing temperature, the crankpin bearing would expand radially outwardly at the joint location and at the same time would expand radially inwardly at locations diametrically opposite from the joint. Essentially, the crankpin bearing would change from a circular configuration to an oval configuration. This change results in a loss of oil film between the crankpin and crankpin bearing which in turn results in scoring of the crankpin and eventually seizing of the crankpin and crankpin bearing.

Another problem with the above arrangement is that it was difficult to maintain the tolerances required in the step or shoulder formed in the joint between the cap member and arcuate bearing portion. As a result, the loss of tolerances resulted in the cap member being essentially permanently mounted on the arcuate bearing portion so that the connecting rod could not be readily disassembled for repair and maintenance.

SUMMARY OF THE INVENTION

The crankpin bearing of a connecting rod includes means for aligning the cap member and crankpin bearing portion. The alignment means comprises a wedge-shaped key and a tapered key-receiving groove formed along the joint between these two components. The key and groove are dimensioned to permit an initial press-fit assembly between the cap member and crankpin bearing portion. The cap member may thereafter be secured in the conventional manner to the crankpin bearing portion by a pair of cap screws or the like.

The assembly eliminates the need to maintain close tolerances of previous alignment mechanisms, and will enable the cap to be readily disassembled from the crankpin bearing portion for repair and maintenance.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
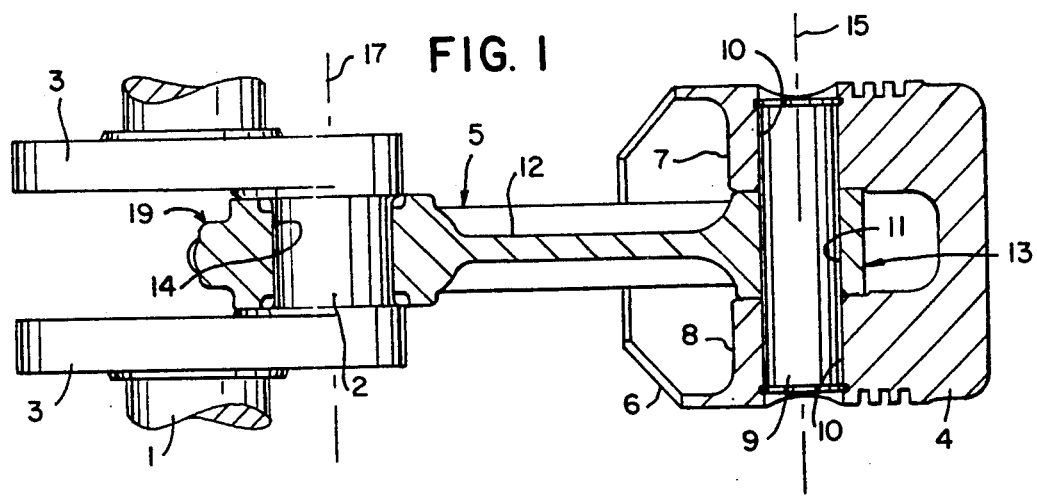
FIG. 1 illustrates one crank of an engine crankshaft and a piston and connecting rod in section taken in a plane containing the axes of the crankpin bearing and piston pin bearing of the connecting rod.
Figure 2:
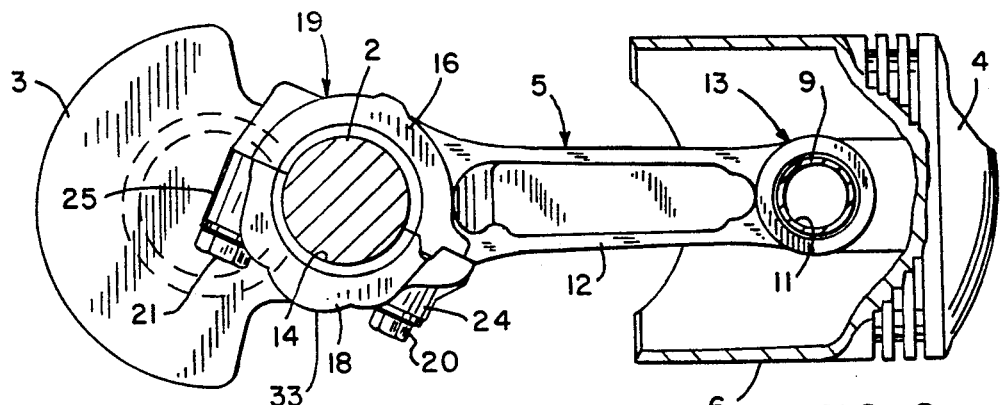
FIG. 2 is an elevational view taken normal to the bearing axes with parts of the crankshaft and piston broken away and in section.

Referring now to the drawings, FIGS. 1 and 2 illustrate a crankshaft 1 for an internal combustion engine (not shown). Crankshaft 1 includes a crankpin 2 having a circular cross-section disposed between and interconnecting a spaced pair of cranks or cheeks 3. A piston 4 is adapted to reciprocate in a corresponding combustion cylinder (not shown) of the engine and is connected to crankpin 2 of crankshaft 1 by a connecting rod 5. Connecting rod 5 transmits the rectilinear thrust of the forces of combustion within the cylinder on piston 4 to rotate crankshaft 1 in a conventional manner. Piston 4 includes a hollow skirt 6 which supports piston 4 in the cylinder walls of the engine. Piston 4 also includes a pair of bosses 7 and 8 formed oppositely on the inside of skirt 6 for supporting wrist pin 9 in aligned holes 10 which are bored through piston 4 to intersect at right angles the reciprocating axis of piston 4. When assembled, pin 9 extends through a piston pin bearing hole 11 formed in the upper end of rod 5 with rod 5 disposed between bosses 7 and 8 inside skirt 6.

Connecting rod 5 comprises a rigid elongate body or beam 12 formed in the shape of an "I", as shown best in FIG. 1. Beam 12 includes a piston pin bearing 13 at its upper end which defines piston pin bearing hole 11 having a first axis 15, and an arcuate shaped crankpin bearing portion 16 at its other or lower end defining part of a crankpin bearing hole 14 and a second axis 17 parallel to axis 15. A separable arcuate shaped cap member 18 is disposed in mating relationship with crankpin bearing portion 16 to form a crankpin bearing 19 when assembled to crankpin bearing portion 16. In order to assemble cap member 18 to crankpin bearing portion 16, a pair of bolts or screws 20 and 21 pass through bores 22 and 23 respectively formed in corresponding bosses 24 and 25 disposed on opposite sides of cap member 18, and are threadedly engaged with female threaded bores 26 and 27 respectively formed on opposite sides of crankpin bearing portion 16. Thus, crankpin bearing 19 is secured about crankpin 2 by turning down bolts 20 and 21, as will hereinafter be described.

Figure 3:
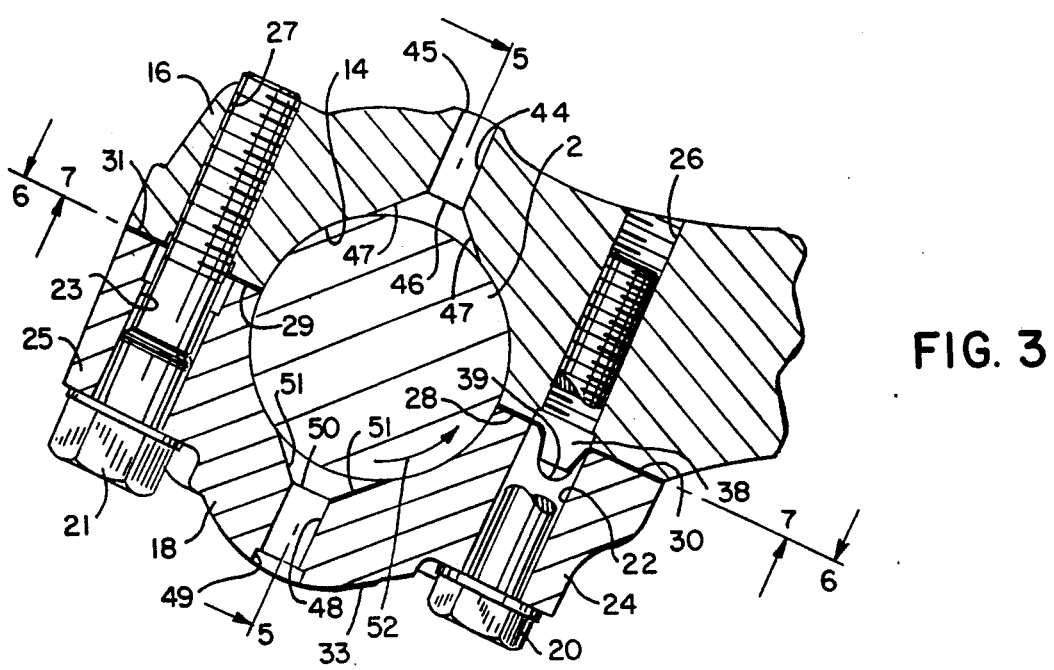
FIG. 3 is an enlarged cross sectional view of the crankpin bearing.
Figure 6:
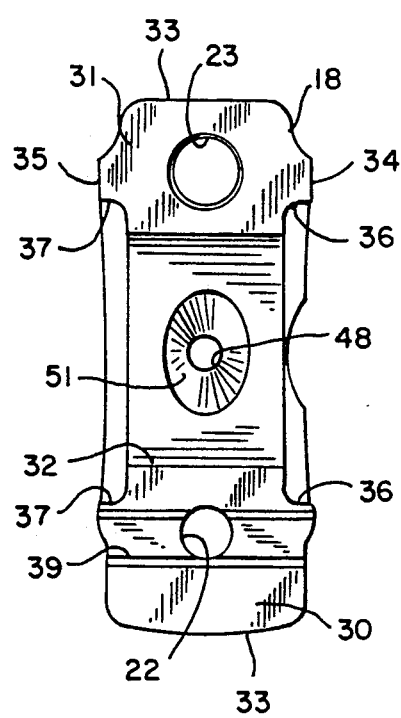
FIG. 6 is a plan view of the inside surface of the cap taken along the plane of the line 6—6 in FIG. 3.
Figure 7:
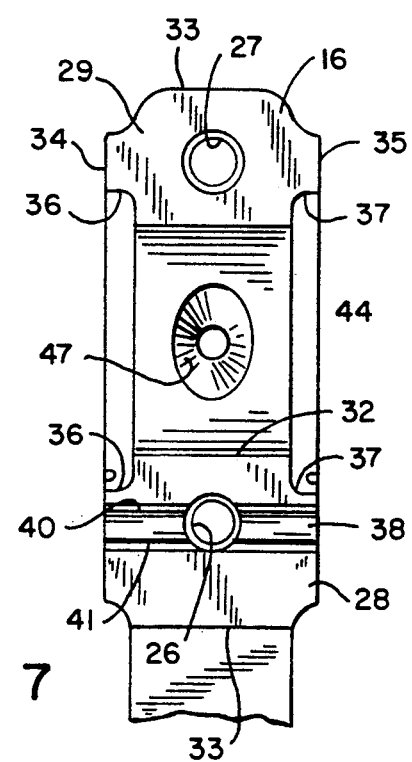
FIG. 7 is a plan view of the inside surface of the crankpin bearing taken along the plane of the line 7—7 in FIG. 3 and illustrating a second oil passageway for the crankpin bearing.

As shown best in FIGS. 3, 6 and 7, crankpin bearing portion 16 includes a pair of opposite, circumferentially spaced apart, radially and axially extending planar lower joint surfaces 28 and 29. In addition, cap member 18 includes a corresponding pair of opposite, circumferentially spaced apart, radially and axially extending planar upper joint surfaces 30 and 31 disposed in mating relationship with lower joint surfaces 28 and 29 respectively. Thus, when cap member 18 is secured to crankpin bearing portion 16, crankpin bearing 19 includes an inner circumferential bearing surface 32 which frictionally engages crankpin 2 during operation of the engine. Crankpin bearing 19 also includes an outer circumferential surface 33 which substantially comprises the exterior cylindrical surface of bearing 19, and a pair of opposite axially spaced planar end walls 34 and 35.

Under normal operation of the engine, a hydrodynamic oil film is provided between the outer cylindrical surface of rotating crankpin 2 and inner surface 32 of bearing 19. During such normal operation, friction between crankpin 2 and bearing 19 is thus minimized resulting in relatively low heat generation, as is conventional. However, when the engine runs in a failure mode of operation, as when the engine runs out of oil, there is a loss of lubrication between crankpin 2 and bearing 19. The loss of oil film results in increased friction between the rotating surfaces of crankpin 2 and crankpin bearing 19 which in turn increases the load on the engine. This increased load also further increases friction. As a result there is an exponential increase in the amount of heat generated at the interface between these two rotating surfaces which occurs in a very short period of time, i.e. in about one second. Much of the heat generated is transferred or radiated in a radially outward manner from inner bearing surface 32 towards outer surface 33. Accordingly, during a failure mode of operation, and in particular during the very short period of time the above-described phenomena is occurring, inner bearing surface 32 is relatively much hotter than outer surface 33. For example, outer surface 33 may be at normal operating temperatures of about 300° F. while inner surface 32 may quickly reach temperature of up to about 1000° F. Such a temperature differential results in crankpin bearing 19 actually expanding radially inward since the relatively cooler outer surface 33 acts to prevent the radially outward heat expansion of bearing 19. In the past, it has been theorized that it is desirable to transfer heat as quickly as possible from inner surface 32 toward outer surface 33 so as to keep surface 32 as cool as possible. However, it has now been determined that when bearing 18 approaches its yield temperature it is more desirable to allow or facilitate expansion radially inwardly so that bearing 19 seizes upon crankpin 2 prior to reaching the yield temperature of the components of bearing 19. This prevents the components of bearing 19 from literally "breaking apart" or self-destructing and causing massive destruction within the engine. Accordingly, in order to provide lower thermal conductivity and thereby inhibit heat transfer from inner bearing surface 32 toward outer circumferential surface 33, crankpin bearing 19 includes a pair of circumferentially extending steps or shoulders 36 and 37 formed between end walls 34 and 35 and inner bearing surface 32. Shoulders 36 and 37 slow down or inhibit heat transfer toward outer surface 33 since there is less material in this area of bearing 19 to conduct heat radially outwardly and thus confines or concentrates the heat generated along surface 32.

Figure 4:
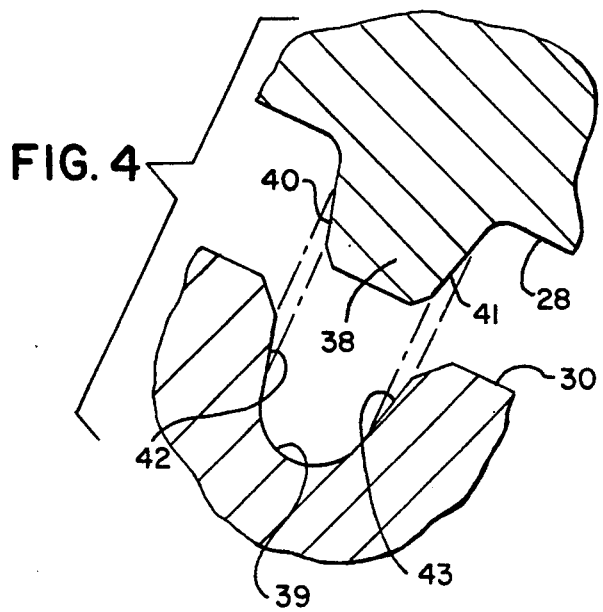
FIG. 4 is an enlarged exploded view illustrating the wedge shape key and key-receiving groove for aligning the cap of the two-piece crankpin bearing.
Figure 5:
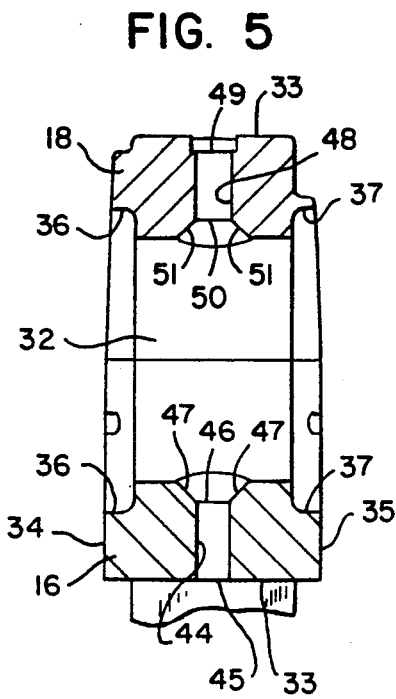
FIG. 5 is a cross sectional view of the crankpin bearing taken along the plane of the 5—5 in FIG. 3.

When assembling cap member 18 to crankpin bearing portion 16 it is desirable to provide some means for aligning these two components so that a smooth continuous surface is provided for inner bearing surface 32. In order to accomplish this, a wedge-shaped key 38 projects upwardly from lower joint surface 28. Key 38 is received within a tapered key-receiving groove 39 formed in upper joint surface 30 of cap 18. As shown best in FIGS. 6 and 7, key 38 and groove 39 extend axially the entire length of surfaces 28 and 30. As shown best in FIG. 4, key 38 includes a pair of opposite converging side walls 40, 41 tapered at an angle of about 105° with respect to surface 28. Groove 39, on the other hand, includes a pair of opposite converging sidewalls 42 and 43 tapered at an angle of about 104.7° with respect to upper surface 30. As shown best in FIGS. 6 and 7, lower joint surface 29 and upper joint surface 31 are both planar and contain no step, shoulder or key arrangement. Accordingly, during assembly, cap member 18 is forced onto crankpin bearing portion 16 so that the material forming walls 40-43 deform and permit an initial press fit assembly for these two components. Thereafter, bolts 20 and 21 are used to complete the assembly and secure cap member 18 to crankpin bearing portion 16 about crankpin 2. Key 38 and groove 39 also permit easy disassembly of cap member 18 from bearing portion 16 due to the "wedging" action thereof.

As shown best in FIG. 3, crankpin bearing 19 is adapted to receive crankpin 2 in its crankpin bearing hole 14. Crankpin 2 rotates within bearing 19 about axis 17 in a direction indicated by arrow 52. As a result, cap member 18 has an upstream end defined by surfaces 29 and 31 as well as a downstream end defined by surfaces 28 and 30 with respect to the direction of rotation of arrow 52 (see FIG. 3).

As previously noted herein, when crankpin bearing 19 approaches its yield temperature, as for example should the engine run out of oil, it is desirable that crankpin bearing 19 stop the engine i.e. seize on crankpin 2 before the temperature reaches a point where the components self destruct. As a further aid in enabling crankpin bearing 19 to seize upon crankpin 2 in such a situation, cap member 18 is secured to crankpin bearing portion 16 by bolts 20 and 21 which have different torque capabilities. Bolt 20 has a relatively low torque capability while bolt 21 has a relatively high torque capability. Accordingly, bolt 20 has a diameter relatively smaller than bolt 21 and is assembled with between about 170-230 lbs. in. of torque while bolt 21 is assembled with between about 298-402 lbs. in. of torque. Essentially, when approaching a failure mode, it is desirable to utilize crankpin bearing 19 as a brake to seize upon crankpin 2 prior to the destruction of the components, as described above. Thus, the high torque capability of bolt 21 maintains the joint between cap member 18 and bearing portion 16 defined by planar surfaces 29 and 31 i.e. the upstream end of cap member 18, closed during a failure mode. If this joint is allowed to open, bearing 19 would not expand sufficiently radially inwardly to seize on crankpin 2 and the engine and crankshaft would thus continue to run allowing the possibility of complete destruction of the crankpin bearing 19 and crankshaft 1. On the other hand, the low torque capability of bolt 20 facilitates the prevention of the opposite joint defined by planar surfaces 28 and 30 i.e. the downstream end of cap member 18 from collapsing or yielding during a failure mode. In other words, as crankshaft 1 rotates, the frictional forces developed are attempting to force joint surface 30 into joint surface 28. Thus, if too much torque is applied by bolt 20 to joint surfaces 28 and 30, these surfaces would become deformed and possibly yield to the point of self destruction. Such is prevented by the use of the lower torque capability bolt 20.

Referring now to FIGS. 3, 5, 6 and 7, there is illustrated a lubrication design for conveying oil into crankpin bearing 17 to improve lubrication distribution between the outer surface of crankpin 2 and inner bearing surface 32. This lubrication distribution means comprises a bore 44 extending through crankpin bearing portion 16 from outer circumferential surface 33 to inner bearing surface 32. Bore 44 includes an exterior inlet 45 opening to outer surface 33 and an interior outlet 46 opening into the crankpin bearing hole 11. As shown best in FIGS. 3 and 5, outlet 46 includes chamfered sidewalls 47 having an angle of between about 30° to about 60° with respect to bore 44. Preferably, sidewalls 47 are chamfered at an angle of 45° with respect to bore 44. Also, it has been found that it is preferred that outlet 46 have an oval cross-section with the cross-sectional area of outlet 46 being at least twice the cross-sectional area of bore 44. In addition, outlet 46 is recessed from inner bearing surface 32 a depth of no more than approximately one-half the thickness of bearing 19 and preferably about one-half the diameter of bore 44. It has been found that the depth and area of outlet 46 as well as the chamfer angle of sidewalls 47 is critical to distributing sufficient oil to the interior of bearing 19. To this end, an identical lubrication opening is formed in cap member 18 at a location diametrically opposite from that of outlet 46 formed in crankpin bearing portion 16. As shown best in FIG. 6, this second opening is identical in structure to the first opening and includes a bore 48, inlet 49, outlet 50 and chamfered sidewalls 51.

It should be particularly noted that although connecting rod 5 is illustrated as being employed with a single cylinder engine, the present invention is readily applicable to multiple cylinder engines. Also, although key 38 is illustrated as projecting from joint surface 28, it could be located on any of the surfaces 28–31 so long as groove 39 is located on the corresponding mating surface opposite thereto.

I claim:

1. A connecting rod for connecting a piston to a crankshaft of an internal combustion engine, comprising:

a rigid beam member having an elongate body including a piston pin bearing at one end of said body defining a piston pin bearing hole having a first axis, and an arcuate-shaped crankpin bearing portion at its other end defining part of a crankpin bearing hole and a second axis parallel to said first axis, said crankpin bearing portion including a pair of opposite, circumferentially spaced apart, radially and axially extending planar lower joint surfaces;

an arcuate-shaped cap member having a pair of opposite, circumferentially spaced apart, radially and axially extending planar upper joint surfaces disposed in mating relationship with said lower joint surfaces to form a pair of opposite parting joints, said cap member and crankpin bearing portion define a crankpin bearing and a crankpin bearing hole when assembled together;

alignment means for aligning said cap member and crankpin bearing portion, said alignment means located in only one of said opposite parting joints and comprising a single wedge-shaped key projecting from one of said planar joint surfaces, said wedge-shaped key having its axial length at least about three times longer than its radial width, and a tapered key-receiving groove formed in the planar joint surface in mating relationship with said one joint surface, said key and groove dimensioned to permit an initial press fit assembly between said cap member and said crankpin bearing portion; and securing means for releasably securing said cap member to said crankpin bearing portion wherein said upper and lower joint surfaces mate with one another to define said crankpin bearing and crankpin bearing hole.

2. The connecting rod of claim 1 wherein said lower joint surfaces are located diametrically opposite one another.

3. The connecting rod of claim 1 wherein said key extends axially the entire length of said one joint surface.

4. The connecting rod of claim 1 wherein said key projects from one of said lower joint surfaces, and said groove is formed in the mating upper joint surface of said cap member.

5. The connecting rod of claim 1 wherein said wedge-shaped key includes a pair of opposite converging side walls tapered at an angle of about 105° with respect to said one planar joint surface.

6. The connecting rod of claim 5 wherein said key-receiving groove includes a pair of opposite converging side walls tapered at an angle of about 104.7° with respect to the planar joint surface in mating relationship with said one joint surface.

* * * * *